US 6,392,185 B1

(12) United States Patent
Beffrieu et al.

(10) Patent No.: US 6,392,185 B1
(45) Date of Patent: May 21, 2002

(54) ELECTRICAL WELDING CLAMP COMPRISING A MECHANICAL DEVICE FOR INDEXING AND DE-INDEXING

(75) Inventors: Michel Beffrieu, 27 avenue Foch, Gournay (FR), 93460; Jean-Luc Ricart, Paris (FR); Gerard De Bruyn, Antony (FR)

(73) Assignees: Michel Beffrieu, Gournay; Christine Menage; Armand Dawidowicz, both of Neuilly sur Seine, all of (FR)

( * ) Notice: Subject to any disclaimer, the term of this patent is extended or adjusted under 35 U.S.C. 154(b) by 0 days.

(21) Appl. No.: 09/601,401
(22) PCT Filed: Feb. 2, 1999
(86) PCT No.: PCT/FR99/00208
　§ 371 Date: Aug. 1, 2000
　§ 102(e) Date: Aug. 1, 2000
(87) PCT Pub. No.: WO99/38640
　PCT Pub. Date: Aug. 5, 1999

(30) Foreign Application Priority Data

Feb. 2, 1998 (FR) .............................. 98 01153

(51) Int. Cl.⁷ ..................... B23K 11/24; B23K 11/36; B23K 11/30
(52) U.S. Cl. ................. 219/86.33; 219/86.25; 219/86.51

(58) Field of Search ............................ 219/86.33, 86.1, 219/86.21, 86.25, 86.51; 228/44.3, 44.7, 51

(56) References Cited

U.S. PATENT DOCUMENTS

| | | | | |
|---|---|---|---|---|
| 5,223,686 A | * | 6/1993 | Benway et al. | ................ 219/60 |
| 5,225,647 A | * | 7/1993 | Dufrenne | .................... 219/109 |
| 5,386,092 A | * | 1/1995 | Dufrenne | ................. 219/117.1 |
| 5,528,011 A | * | 6/1996 | Kono et al. | ............. 219/86.41 |
| 5,582,747 A | * | 12/1996 | Sakai et al. | ................. 219/109 |
| 5,705,783 A | * | 1/1998 | Baustert | ..................... 219/120 |
| 5,914,056 A | * | 6/1999 | Yamaguchi | ............. 219/86.41 |
| 6,118,095 A | * | 9/2000 | Nagano | ..................... 219/109 |

* cited by examiner

Primary Examiner—Tom Dunn
Assistant Examiner—Colleen P. Cooke
(74) Attorney, Agent, or Firm—Young & Thompson

(57) ABSTRACT

The welding gun includes an electrically driven welding clamp comprising a fixed indexed arm and a mobile arm, respectively provided with an electrode, and a device for indexing and de-indexing locking and releasing the clamp movement relative to the welding plane. The device for indexing and de-indexing includes a mechanical device arranged to ensure the locking and the releasing of the clamp movement, while the clamp is opening/closing, by the action of an electrical device controlling the opening and closing of the clamp.

9 Claims, 1 Drawing Sheet

ELECTRICAL WELDING CLAMP COMPRISING A MECHANICAL DEVICE FOR INDEXING AND DE-INDEXING

FIELD OF THE INVENTION

The present invention relates to an electric welding gun comprising a device permitting indexing and de-indexing, which is to say the locking and the unlocking of the movement of the clamp, for example the rotation in the case of a clamp about X or the translation in the case of a clamp along J, relative to its support, for example an arm of a robot on which the clamp is mounted.

BACKGROUND OF THE INVENTION

A welding cycle is comprised of three phases: approach, welding and disengagement. During the welding phase, a welding clamp must be able to undergo a movement for example opening and closing, relative to the robot so as to adapt to the plates to be assembled, in particular during approach which corresponds to the insertion and superposition of the two pieces to be welded between the electrodes and the clamp and the establishment of a stabilized force of the two electrodes creating an electric circuit.

Once welding is completed, the clamp is then opened and brought by the robot to another point where welding is to be carried out.

In the course of these movements, in particular to emplace the welding gun relative to the plates to be assembled, the movement of the clamp, which is open, can become troublesome and prevent a precise path and positioning of the assembly. Thus, so as to optimize the cycle time of the robot, the latter always move along two different axes at its maximum speed. Because of this, during given accelerations of the robot, the welding gun tends to oscillate.

Also, to avoid substantial inertial phenomena and to avoid the gun turning because of acceleration imparted by the robot, the movement of the assembly of the clamp is momentarily locked by an indexing system. Also, most of the welding clamps are provided with an index system having an influence on the clamp during its displacement from one work station to another, for example.

The electric motor-driven welding clamps generally used, have an indexing and de-indexing system constituted by a jack of which the extended position of the rod permits blocking the clamp and of which the retracted position of the rod frees the movement of the clamp so as to permit self-centering of the electrodes on a plate to be assembled during approach, and this without imparting force to the plates. So as to promote self-centering, the clamp comprises balancing springs permitting giving to the clamp a balanced position about its welding plane.

However, in the case of electric motorized welding clamps, the presence of the jack requires, in addition to the electric motor circuit of the clamp, the presence of a compressed air circuit as well as all the elements associated therewith, namely tubing, a compressor, etc.

It is thus necessary to provide two different types of supply.

SUMMARY OF THE INVENTION

The present invention accordingly seeks to overcome these drawbacks by providing an electric welding gun having an electric motorized welding clamp in which the locking and unlocking device of the movement of the welding clamp relative to the welding plane, does not need a pneumatic, hydraulic or other supply.

To this end, the present invention has for its object an electric welding gun having an electric motorized welding clamp comprising a fixed indexed arm and a movable arm, provided respectively with an electrode, as well as an indexing and de-indexing device locking and unlocking the movement of the clamp relative to the welding plane. The indexing and de-indexing device comprises mechanical means arranged to ensure locking and unlocking of the movement of the clamp, in the course of the opening/closing movements of the clamp, under the influence of electrical control means for opening and closing the clamp.

Because of this, at the end of a welding phase, during opening of the clamp by the electrical control means, the mechanical means act on the clamp so as to index it, while conversely, an actuation of the electrical control means in the direction of closing the clamp results in driving the mechanical means to de-index the clamp.

A welding gun according to the invention can thus have an X clamp as well as a J clamp.

In the case of an X clamp, according to a preferred embodiment, the mechanical means of the indexing and de-indexing device of the clamp are constituted by a cam, a rod and a roller, the cam being mounted rotatably about its axis of securement on an ear of the selected fixed arm of the clamp, the rod having one end mounted rotatably about its axis of connection with the cam, the connection axis being parallel to the axis of securement of the cam and spaced from the latter, and one end mounted rotatably about a drive trunnion whose longitudinal axis is also parallel to the axis of rotation of the cam, the drive trunnion being itself in sliding pivotal connection with the ear of the second arm of the required movable clamp, the roller being itself secured to the articulation of the clamp and adapted to coact with the profile of the cam.

Preferably, the roller is mounted, by means of a support of the indexing device, secured to the articulation of the clamp, the axis of the roller being parallel to the axis of securement of the cam, the roller being adapted to roll along the profile of the cam and the roller being moreover mounted slidably relative to its support, the sliding in translation being limited by resilient return means such as an elastomeric member.

The cam has a profile defined by different radii different diameters of the cam and, when the roller rolls along the greater diameter of the cam, the arms of the clamp having a movement of rotation about the articulation of the clamp, index themselves.

A welding gun according to the invention therefore has only a single electrical supply and it is thus not necessary to provide a pneumatic or hydraulic supply for the indexing and de-indexing device. There can thus also be omitted all the circuits and components concerned with another supply such as a pneumatic supply for example, the tubing, a compressor, etc.

Preferably, a welding gun according to the invention has moreover additional safety to the extent that, in the case of the absence of energy supply to the clamp, the clamp and in particular its indexing and de-indexing device remain in position and the clamp remains manually usable.

Moreover, there is obtained a welding gun in which the speed of indexing and de-indexing does not depend on the speed of a jack but on the speed of the electric motor actuating the clamp. Furthermore, the roller rolling on the cam leads to gentle indexing, in contrast to a jack, which is abrupt.

BRIEF DESCRIPTION OF THE DRAWINGS

The invention will now be described in greater detail using the example of embodiment of an X clamp with reference to the accompanying drawing, in which.

DETAILED DESCRIPTION OF THE PREFERRED EMBODIMENT(S)

Figure 1:
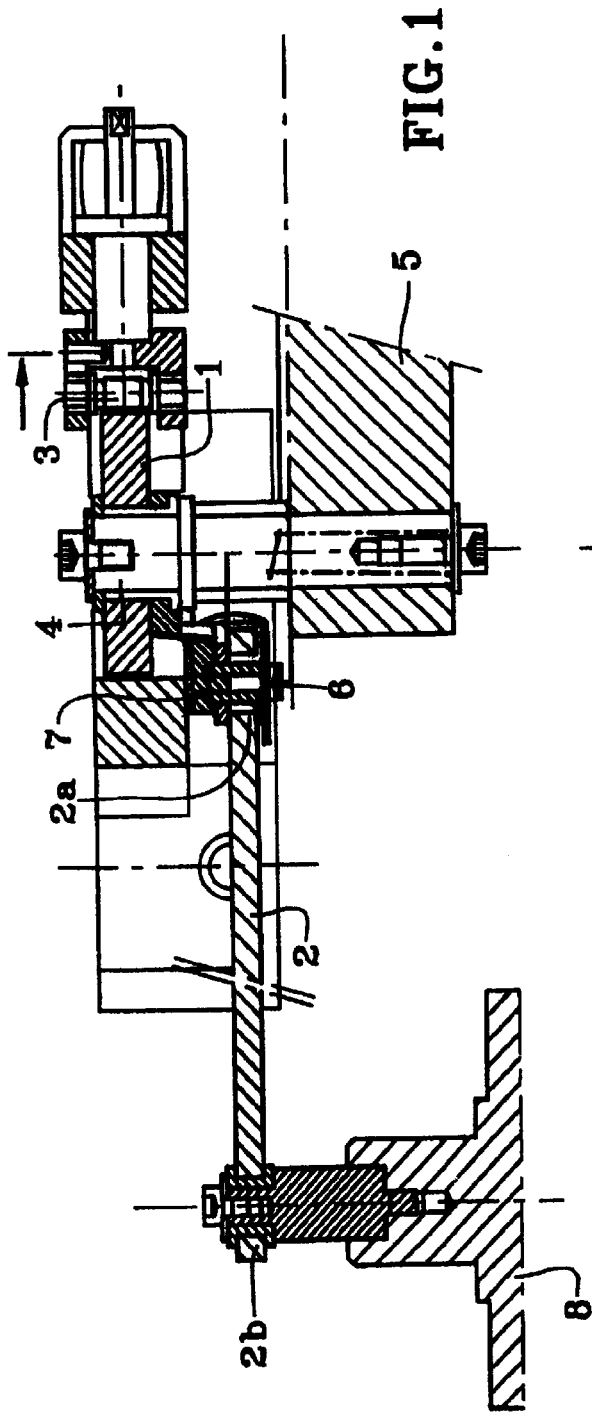
FIG. 1 is a side cross-sectional view of an indexing and de-indexing device of the welding gun according to the invention.
Figure 2:
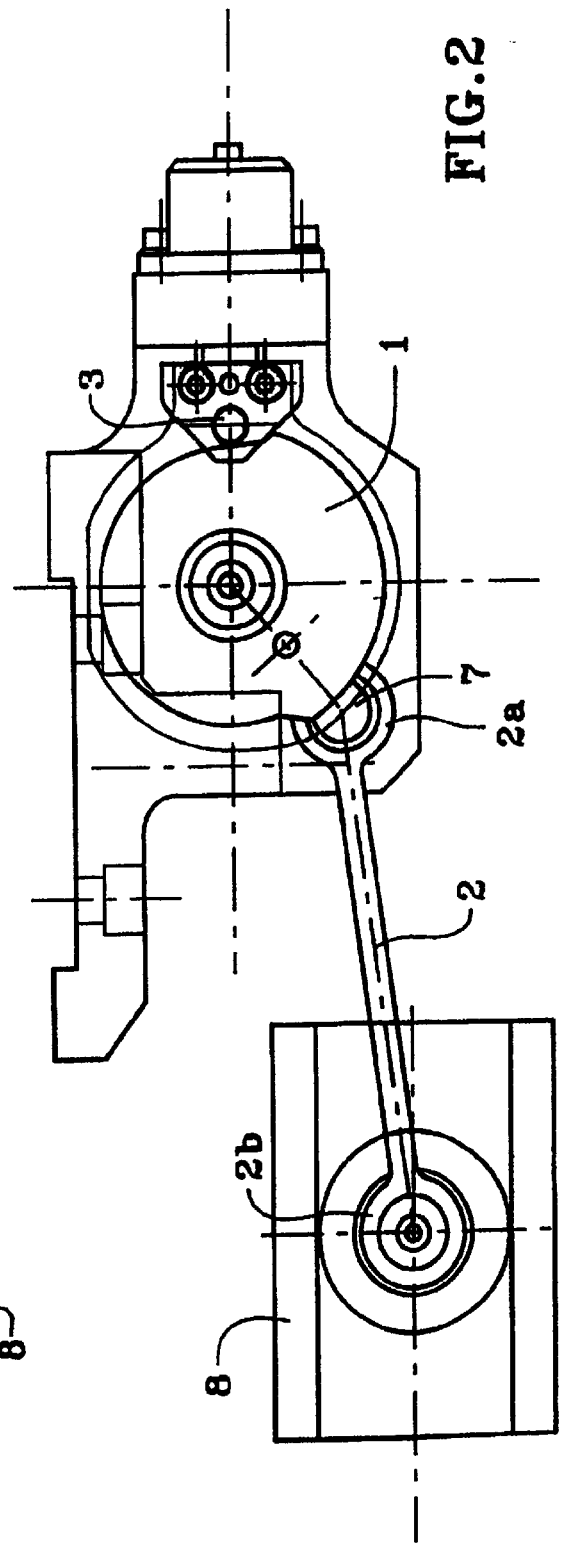
FIG. 2 is a plan view of the device according to FIG. 1.

In the case of an electric motorized X welding clamp, the latter comprises a fixed indexed arm 5 and a movable arm, the indexing or de-indexing device acting on the assembly of the clamp so as to lock or not the rotation relative to the arms.

The indexing and de-indexing device comprises a cam 1, a rod 2 and a roller-resilient return system 3.

The ear of the support of the necessary fixed arm 5 of the clamp has a finger 4 constituting the axle of the cam 1 and on which is rotatably mounted the cam 1.

One end of the rod 2 coacts with the cam 1 by means of a connection member 7 secured to the lower surface of the cam 1, preferably adjacent the peripheral edge of the cam 1, and having an axle 6, parallel to the finger 4, on which the end 2a of the rod 2 is rotatably mounted.

The second end 2b of the rod 2 is rotatably mounted about a drive trunnion 8 which is in pivotal sliding connection with the ear of the other arm of the required movable clamp.

The drive trunnion 8 is generally constituted by a nut slidably mounted along a screw coupled to the reducer of the electric motor of the clamp.

The roller 3 is mounted by means of a support of the indexing device, secured to the articulation of the clamp, the axis of the roller 3 being parallel to the axis of the finger 4 on which is mounted the cam 1, the roller 3 being adapted to roll along the profile of the cam.

Moreover, the roller 3 is slidably mounted relative to its support, the sliding in translation being limited by a resilient return means such as an elastomeric member.

During opening actuation of the clamp, the trunnion 8 drives the rod 2 which impresses on the cam 1 a rotative movement. As a function of the different diameters of the cam 1, the roller 3 rolls on the cam 1. The arms of the clamp having a rotative movement about the articulation of the clamp, they index themselves when the roller 3 rolls on the largest diameter of the cam 1. During closing of the clamp, it is the reverse movement which takes place.

Thus, when the clamp is opened after a welding phase, the clamp indexes itself and afterward the movable arm of the clamp is located at about 5 mm relative to the theoretical welding plane. Preferably, at the beginning of indexing, the distance between the electrodes is thus 10 mm and at the end of indexing 15 mm. The clamp remains indexed during complete opening.

The dimension of the different elements constituting the index and de-indexing device is determined for each size of clamp as a function of the desired size of the intervals between the electrodes of the gun.

What is claimed is:

1. An electric welding gun comprising:

an electric motorized welding clamp with a fixed indexed arm and a movable arm, each of the fixed arm and movable arm being provided with an electrode, an indexing and de-indexing device locking and unlocking the movement of said clamp relative to a welding plane, said indexing and de-indexing device comprising a mechanical means arranged to ensure the locking and the unlocking of the movement of said clamp, in the course of opening and closing movements of said clamp, and an electric control means connected to said mechanical means for opening and closing said clamp.

2. The welding gun according to claim 1, wherein said welding clamp comprises a J clamp.

3. The welding gun according to claim 1, wherein said welding clamp comprises an X clamp.

4. The welding gun according to claim 3, wherein said mechanical means of said indexing and de-indexing device comprises a cam, a rod and a roller, said cam being mounted rotatably about its axis of securement on an ear of said fixed arm of said clamp, said rod having one end mounted rotatably about its connection axis with said cam, said connection axis being parallel to the axis of securement of said cam and spaced from the latter, and one end mounted rotatably about a drive trunnion whose longitudinal axis is also parallel to the axis of rotation of said cam, said drive trunnion being in sliding pivotal connection with the ear of the second arm of the movable clamp, said roller being itself secured to the articulation of said clamp and adapted to coact with the profile of said cam.

5. The welding gun according to claim 4, wherein said cam has different diameters, the largest diameter of said cam corresponding to the indexing of said clamp.

6. The welding gun according to claim 4, wherein said axis of securement of said cam comprises a finger secured to the ear of said fixed arm of said clamp.

7. The welding gun according to claim 4, wherein the end of said rod coacts with said cam by a connection member secured to the lower surface of said cam and having an axis on which the end is rotatably mounted.

8. The welding gun according to claim 4, wherein said roller is mounted, by a support of said indexing device, secured to the articulation of said clamp, the axis of said roller being parallel to the axis of securement of said cam, said roller being adapted to roll along the profile of said cam and said roller being moreover mounted slidably relative to its support, the sliding in translation being limited by a resilient return means.

9. The welding gun according to claim 4, wherein said drive trunnion comprises a nut slidably mounted along a screw coupled to the reducer of the electric motor of said clamp.

* * * * *